United States Patent
Jones et al.

(10) Patent No.: US 7,519,970 B2
(45) Date of Patent: Apr. 14, 2009

(54) METHODS, SYSTEMS AND COMPUTER PROGRAM PRODUCTS FOR CREATING USER INTERFACE TO APPLICATIONS USING GENERIC USER INTERFACE TEMPLATES

(75) Inventors: Carol Ann Jones, Raleigh, NC (US); Patrick McGowan, Stoney Creek, NC (US); Christopher Joseph Paul, Durham, NC (US); Shankar Ramaswamy, Chapel Hill, NC (US); Cesar A. Wong, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 924 days.

(21) Appl. No.: 10/673,752

(22) Filed: Sep. 29, 2003

(65) Prior Publication Data

US 2005/0071853 A1    Mar. 31, 2005

(51) Int. Cl.
G06F 3/00 (2006.01)
G06F 9/44 (2006.01)
G06F 9/46 (2006.01)
G06F 13/00 (2006.01)

(52) U.S. Cl. .................................. 719/317; 715/236
(58) Field of Classification Search ................. 719/318, 719/317; 715/236
See application file for complete search history.

(56) References Cited

U.S. PATENT DOCUMENTS

| | | | |
|---|---|---|---|
| 6,850,893 B2 * | 2/2005 | Lipkin et al. | 705/8 |
| 6,934,740 B1 * | 8/2005 | Lawande et al. | 709/213 |
| 7,080,350 B2 * | 7/2006 | Saimi et al. | 717/100 |
| 2001/0051961 A1 * | 12/2001 | Duxbury | 707/517 |
| 2002/0049788 A1 * | 4/2002 | Lipkin et al. | 707/513 |
| 2002/0138582 A1 * | 9/2002 | Chandra et al. | 709/206 |
| 2003/0055868 A1 * | 3/2003 | Fletcher et al. | 709/201 |
| 2004/0078371 A1 * | 4/2004 | Worrall et al. | 707/9 |

OTHER PUBLICATIONS

*Portlet Builder for Domino: Building Portlets the Easy Way*, Presented by developerWorks, ;your source for great tutorials, pp. 1-34; Aug. 2003.

* cited by examiner

*Primary Examiner*—Meng-Ai An
*Assistant Examiner*—Nathan Price
(74) *Attorney, Agent, or Firm*—Joseph A. Bracken; Dillon & Yudell LLP

(57) ABSTRACT

A user interface template that implements a task pattern for a model class and a model adapter that provides an interface for the application that conforms to the model class are identified. A user interface for the application is created from the identified user interface template and the identified model adapter. The user interface template may include a generic view and a generic controller. The model adapter may provide a business object interface, and may be configured to communicate with the application via a J2EE Connector Architecture (JCA) connector. The user interface template may define an abstract portlet, and creating a user interface includes creating a portlet instance that communicates with the application via the model adapter. The portlet instance may be configured using an application portlet builder portlet. The portlet builder may also identify the user interface template and the model adapter.

12 Claims, 5 Drawing Sheets

METHODS, SYSTEMS AND COMPUTER PROGRAM PRODUCTS FOR CREATING USER INTERFACE TO APPLICATIONS USING GENERIC USER INTERFACE TEMPLATES

BACKGROUND OF THE INVENTION

The present invention relates to portal-based pervasive computing, and more particularly, to methods, apparatus and computer program products for providing user interfaces in a portal-based pervasive computing environment.

A common task with the expansion of the Internet is the development of web-based user interfaces to legacy applications, such as Enterprise Information Systems (EIS) (e.g., Enterprise Resource Planning (ERP) systems and Customer Relationship Management (CRM) systems), databases, and mainframe applications. Conventionally, web-based user interfaces to such applications may be constructed using what is commonly referred to as a "Model-View-Controller" (MVC) architecture. According to an MVC paradigm, user input, modeling of the external world, and visual feedback to the user are explicitly separated and handled by three respective types of objects or entities, each specialized for its task. For example, a view may manage graphical and/or textual output to a portion of a bitmapped display that is allocated to its application, a controller may interpret mouse and keyboard inputs from the user, commanding the model and/or the view to change as appropriate, and a model may manage the behavior and data of the application domain, respond to requests for information about its state (usually from the view), and respond to instructions to change state (usually from the controller).

Conventionally, web user interfaces are often developed by creating custom view and controller objects for each user that are designed to interact with a source of data, for example, a database or an application such as a customer relationship management (CRM) or enterprise resource planning (ERP) application. Such an approach, however, can be inefficient.

SUMMARY OF THE INVENTION

According to some embodiments of the present invention, a user interface is provided for an application, such as an EIS or database application. A user interface for the application is created from an identified user interface template and one or more identified model class adapters. A user interface template implements one or more well-defined task patterns utilizing one or more models accessed via standardized model class interfaces. The user interface template may include one or more generic views and one or more generic controllers. A model class adapter implements a specific standardized model class interface for a given application. The model class adapter may be configured to communicate with the application via the J2EE Connector Architecture (JCA) interfaces.

According to further embodiments of the present invention, the user interface template may be implemented using an abstract portlet, and creating a user interface may involve creating a concrete portlet instance that communicates with the application using one or more model class adapters. The concrete portlet instance may be configured using an application portlet builder portlet. The portlet builder may also identify the user interface template and the model class adapters.

The invention may be embodied as methods, systems and computer program products.

DETAILED DESCRIPTION OF EMBODIMENTS

Figure 1:
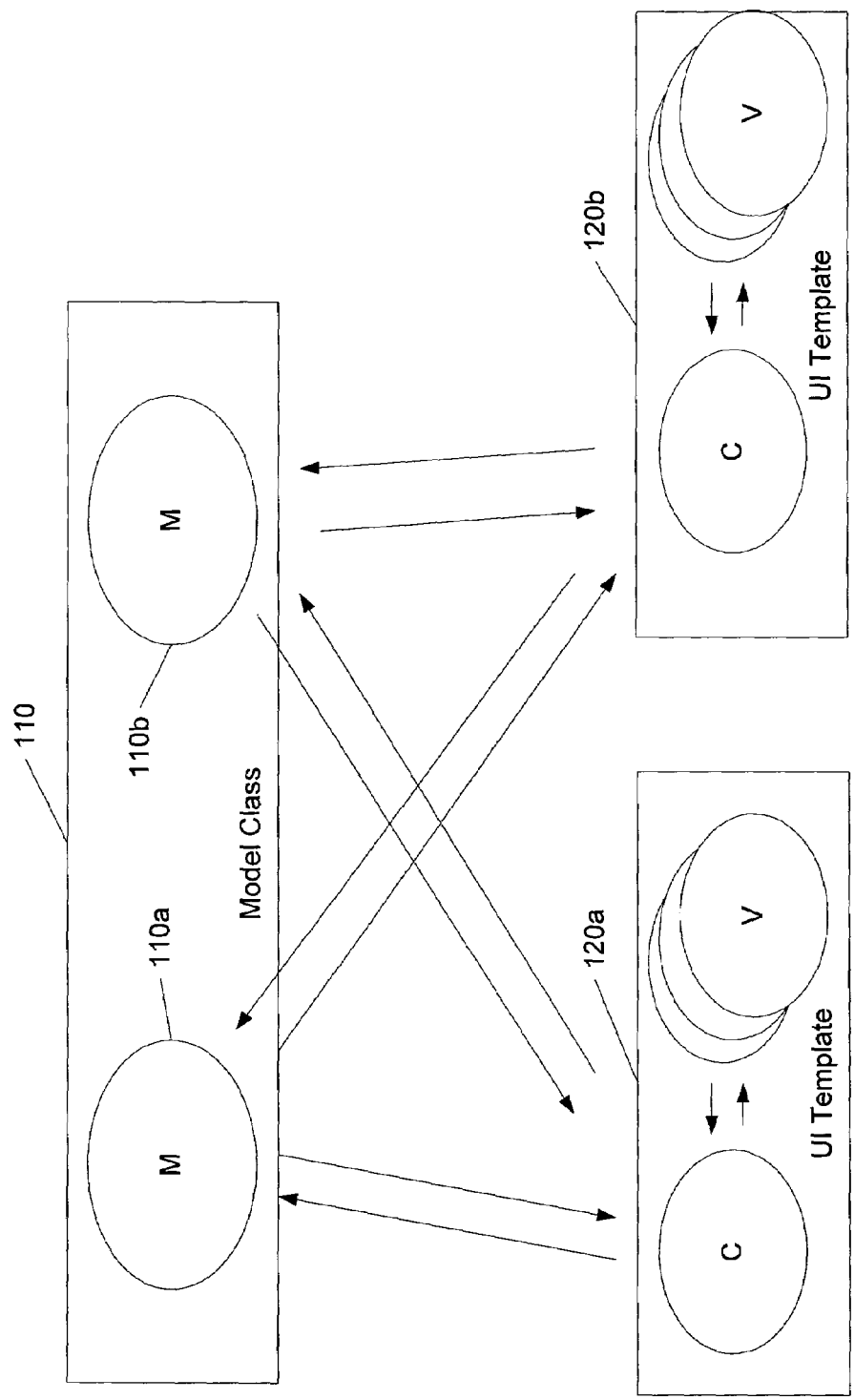
FIG. 1 is a block diagram illustrating a model-view-controller architecture according to some embodiments of the present invention.

The present invention is described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers and reference designators refer to like elements throughout.

As will be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code or "code" for carrying out operations according to the present invention may be written in an object oriented programming language such as JAVA™, Smalltalk or C++, JavaScript™, Visual Basic®, TSQL, Perl, or in various other programming languages. Software embodiments of the present invention do not depend on implementation with a particular programming language. Portions of the code may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present invention is not TCP/IP-specific or Internet-specific. The present invention may be embodied using various protocols over various types of computer networks.

The present invention is described below with reference to block diagrams and/or flowchart illustrations of methods, systems and computer program products according to embodiments of the invention. It is understood that each block of the block diagrams and/or flowchart illustrations, and combinations of blocks in the block diagrams and a flowchart illustration, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagrams and/or flowchart block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

Embodiments according to the invention can operate in a logically separated client side/server side computing environment, sometimes referred to hereinafter as a client/server environment. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers. A server can be a program that responds to the requests from the client. Some examples of servers are International Business Machines Corporation's family of Lotus Domino® servers, the Apache server (available from www.apache.org), and Microsoft's Internet Information Server (IIS) (Microsoft Corporation, Redmond, Wash.).

The clients and servers can communicate using a standard communications mode, such as Hypertext Transport Protocol (HTTP). According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Although the present invention is described herein with reference to web portals as may be provided on web pages, the present invention is not limited to the web. The present application is applicable to any of a variety of implementations, including implementation in a network including nodes that communicate with each other over a communication link, such as over the Internet, an intranet, a wireless network, or any other type of communications system.

As is known to those skilled in this art, a Web page is conventionally formatted via a standard page description language such as HyperText Markup Language (HTML), which typically contains text and can reference graphics, sound, animation, and video data. HTML provides for basic document formatting and allows a Web content provider to specify anchors or hypertext links (typically manifested as highlighted text) to other servers. When a user selects (i.e., activates) a particular hypertext link, a browser running on the user's client device reads and interprets an address, called a Uniform Resource Locator (URL) associated with the hypertext link, connects the browser with a Web server at that address, and makes a request (e.g., an HTTP request) for the file identified in the hypertext link. The Web server then sends the requested file to the client that interprets and renders the Web page for display.

A web browser can be used to view what is sometimes referred to as a web portal (or portal). As understood by those skilled in the art, web portals can operate according to the same communications protocols described above in reference to clients and servers where the client is a web browser that views portal pages and the server is sometimes referred to as a portal applications server that serves requested information to the web browser.

A portal can be a single presentation (or view) of information from multiple sources, sometimes referred to as an aggregation of information. Portals often include information such as: calendars and to-do lists, discussion groups, announcements and reports, news, stock quotes, searches, e-mail and address books, weather, maps, shopping, and the like, all of which may be provided to the portal by different sources and/or applications.

Portlets are visible active components users of the portal see within the portal page. Similar to a window in a PC desktop, each portlet is allocated a portion of the client screen where the relevant information is displayed. A portlet can be generated by a computer program, written for example in Java™, to provide the content to be embedded into portal pages viewed by the user.

Some embodiments of the present invention arise from a realization that an efficient approach to creation of user interfaces, such as portlets, can be based on identifying model classes that support the same fixed set of operations that can be described using a standard set of metadata attributes, and that a user interface template that includes one more generic controllers and one or more generic views that rely on such metadata can be used to implement user interfaces for the models in the class. Such controllers and views are generic in the sense that they can work with all models of a given model class without being tied to specifics of a particular model. As shown in FIG. 1, user interface (UI) templates 120a, 120b representing combinations of generic views V and controllers C may be designed and implemented for models 110a, 110b of a model class 110, and can dynamically exploit individual model characteristics using metadata attributes.

For example, according to some embodiments of the present invention, user interface templates using generic views and controllers can be provided to represent common ways (or task patterns) in which users interact with applications and work with application data. Examples of such patterns are "Search and Browse," "Maintenance," "Shopping Cart," "Request," etc. Such templates can be used with any data that can be described using the models that the template understands. Such an approach can provide several benefits, including the ability to develop user interface templates separately from the application data that they use, and the ability to create a user interface by combining the right user interface template with the right application data.

Specific exemplary embodiments of the present invention described herein relate to a WebSphere Portal Application Integrator (WPAI) developed by IBM Corporation. WPAI is designed for rapidly creating portlets for back-end business applications and data, such as EIS (e.g., SAP®, Siebel®, PeopleSoft®), relational databases (e.g., DB2®, Oracle®, Informix®, SQL Server™), and other applications (e.g., Domino™, Ariba®, Documentum™). It will be appreciated, however, that the described embodiments are provided for illustrative purposes, and that other implementations fall within the scope of the present invention.

WPAI uses the notion of model classes to efficiently deal with data from back-end applications. Models are grouped into model classes where all members of the group exhibit similar characteristics. Models belonging to the same model class are accessed and modified via a single set of interfaces and individual model characteristics for a given model class are described using a standard set of meta-data attributes. The data accessible from every application handled by WPAI is classified into an appropriate model class and a model class adapter is built for the application that uses the application's native interfaces to implement the required model class interfaces. All knowledge of the application's behavior is confined to the model class adapter implementation. For example, WPAI defines the Business Objects model class to deal with data from EIS applications and relational databases. Business Objects are defined to be collections of fields with a field itself being another Business Object as well as potentially multi-valued. Business Objects fields have a standard set of meta-data attributes associated with them to provide detailed information about them such as whether a field is required to have a value, whether a field is computed automatically, whether a field can be used to search for instances of the Business Object, etc. Business Objects also have a fixed set of operations associated with them, such as create, retrieve, update, delete, close, publish, etc. Business Object adapters may be implemented per back-end application such as SAP, Siebel, PeopleSoft, DB2, etc. They may be based on the J2EE Connector Architecture (JCA), which defines a standard architecture for connecting J2EE based applications to heterogeneous information systems.

WPAI provides user interface templates built using generic views and controllers that represent one or more task patterns that use a set of models obtained from particular model classes to facilitate the rapid creation of user interfaces for back-end applications. A task pattern represents a sequence of steps a user would take to perform some well-defined work using application data. For example, a simple task pattern used when working with data from EIS systems and relational databases is the Search-And-Browse pattern. When using this pattern, the user enters search criteria for a specific type of data and then obtains matching instances of that type of data and browses through it. This Search-and-Browse pattern can be implemented as a user interface template for the Business Objects model class.

WPAI creates user interfaces by combining user interface templates with specific models obtained using appropriate model class adapters. For example, by combining the Search-and-Browse user interface template with the Sales Order Business Object obtained using an SAP Business Object adapter, a user can be allowed to search and browse sales order data stored in an SAP system.

In WPAI, user interface templates are implemented using abstract portlets. These abstract portlets are bound with specific models (obtained using appropriate model class adapters) to create concrete portlet instances. These concrete portlet instances contain configuration information for the adapters as well as customization settings for the templates. The tool used to define these concrete portlet instances is another portlet called an application portlet builder. The purpose of the application portlet builder is to identify a user interface template, identify the model adapters to be used to obtain the models used by the user interface template and configure the adapters appropriately and finally, to customize the behavior of the user interface template itself.

Figure 2:
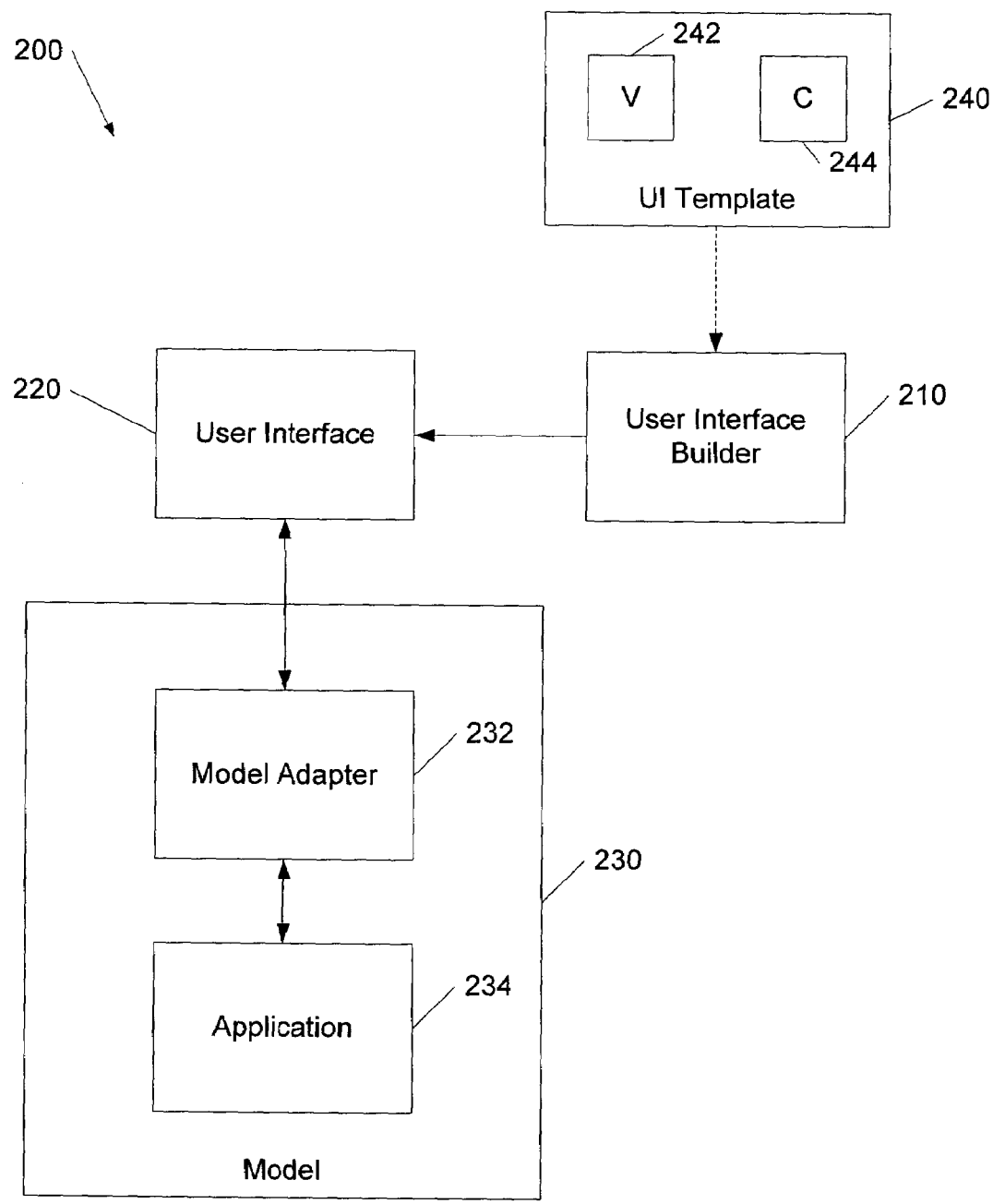
FIG. 2 is a block diagram illustrating a data processing system and exemplary operations thereof according to some embodiments of the present invention.
Figure 3:
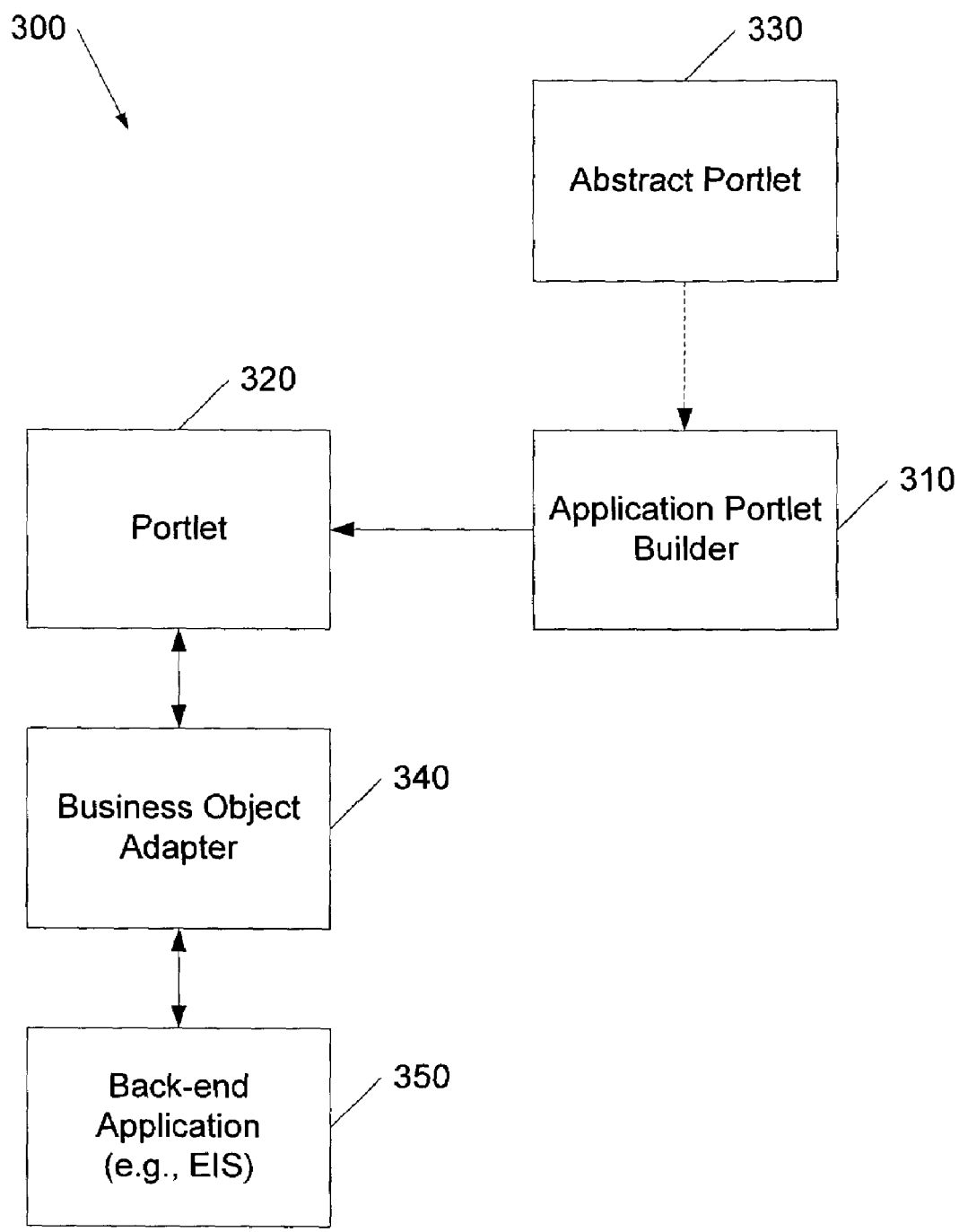
FIG. 3 is a block diagram illustrating a data processing system and exemplary operations thereof according to further embodiments of the present invention.

Referring to FIG. 2, a data processing system 200 according to some embodiments of the present invention includes a user interface builder object 210 that instantiates a user interface object 220 according to a user interface template 240 that defines a task pattern for a given set of model classes, e.g., defines one or more generic views 242 and controllers 244. The user interface object 220 provides a user interface to one or more models 230, each comprising an application 234 and a model adapter 232 that provides an interface to the application 234 that conforms to the associated model class. FIG. 3 illustrates a data processing system 300 according to further embodiments of the present invention. The system 300 includes an application portlet builder portlet 310 configured to generate configuration information for a portlet instance 320 that binds a user interface template in the form of an abstract portlet 330 with a business object type defined by a business object adapter 340. The business object adapter 340 provides access to business object instances defined for a back-end application 350, for example, an EIS such as an ERP or CRM system.

Figure 4:
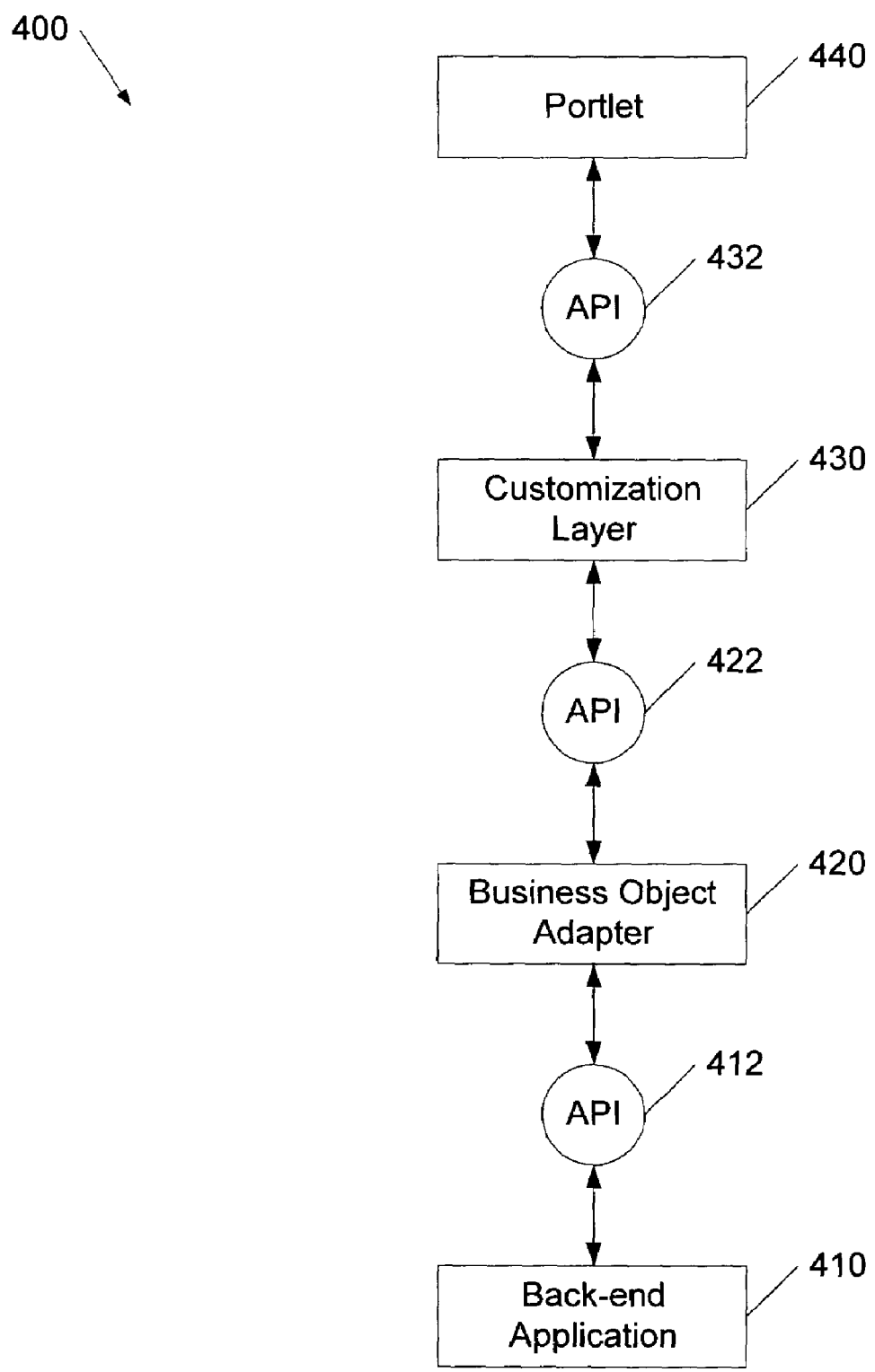
FIG. 4 is a block diagram illustrating exemplary portlet-business object interactions according to some embodiments of the present invention.
Figure 5:
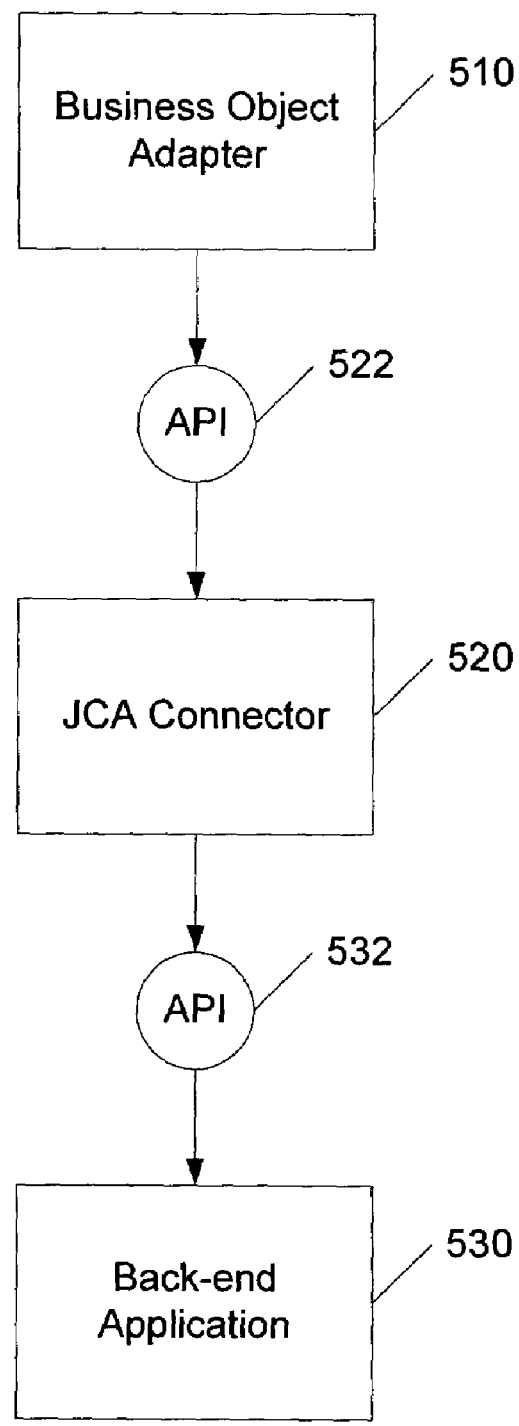
FIG. 5 is a block diagram illustrating exemplary business object interactions according to further embodiments of the present invention.

In a data processing system 400 according to further embodiments of the present invention illustrated in FIG. 4, a back-end application 410, e.g., an EIS, implements a back-end application program interface (API) 412. A business object adapter 420 is configured to communicate according to the back-end API 412 and to implement a business object model API 422. A customization layer 430 is configured to communicate according to the business object model API 422, and implements a customized business object API 432. A portlet instance 440 is operative to communicate according to the business object API 432. As shown in FIG. 5, a business object adapter 510 may communicate with a back-end application 530 via a JCA connector 520 that implements a back-end proxy API 522. The JCA connector 520 communicates with the back-end application 530 according to a back-end API 532 implemented by the application 530.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of providing a user interface for an application, the method comprising:

identifying a user interface template that implements a task pattern for a model class;

identifying a model adapter that provides an interface for the application that conforms to the model class; and creating a user interface for the application from the identified user interface template and the identified model adapter;

wherein the user interface template defines an abstract portlet; and wherein creating a user interface comprises creating a portlet instance that communicates with the application via the model adapter.

2. A method according to claim 1, wherein the user interface template comprises a generic view and a generic controller.

3. A method according to claim 1, wherein creating a portlet instance comprises configuring the portlet instance using an application portlet builder portlet.

4. A method according to claim 1, wherein identifying a user interface template, identifying a model adapter and creating a portlet instance are performed using an application portlet builder portlet.

5. A method according to claim 1, wherein the model adapter provides a business object interface.

6. A computer apparatus configured to provide:

a user interface builder object operative to identify a user interface template that implements a task pattern for a model class, to identify a model adapter that provides an interface for an application that conforms to the model class, and to create a user interface for the application from the identified user interface template and the identified model adapter;

wherein the user interface template defines an abstract portlet; and wherein the user interface builder is operative to create a portlet instance that communicates with the application via the model adapter.

7. A computer apparatus according to claim 6, wherein the user interface template comprises a generic view and a generic controller.

8. A computer apparatus according to claim 6, wherein the user interface builder comprises an application portlet builder portlet operative to configure the portlet instance.

9. A computer apparatus according to claim 6, wherein the model adapter provides a business object interface.

10. A computer program product for providing a user interface to an application, the computer program product comprising computer readable code embodied in a computer readable storage medium, the computer readable code comprising:

program code configured to provide a user interface builder object operative to identify a user interface template that implements a task pattern for a model class, to identify a model adapter that provides an interface for the application that conforms to the model class, and to create a user interface for the application from the identified user interface template and the identified model adapter;

wherein the user interface template defines an abstract web portlet; and wherein the code configured to provide a user interface builder comprises code configured to create a concrete web portlet instance that communicates with the application via the model adapter.

11. A computer program product according to claim 10, wherein the user interface template comprises a generic view and a generic controller.

12. A computer program product according to claim 10, wherein the code configured to create a concrete web portlet instance comprises code configured to provide an application portlet builder portlet operative to configure the portlet instance.

* * * * *